United States Patent
Watabe et al.

(10) Patent No.: US 8,514,410 B2
(45) Date of Patent: Aug. 20, 2013

(54) DISPLACEMENT DETECTION DEVICE AND METHOD

(71) Applicant: Kabushiki Kaisha Toshiba, Minato-ku (JP)

(72) Inventors: Kazuo Watabe, Yokohama (JP); Takashi Usui, Saitama (JP); Hideaki Okano, Yokohama (JP); Akihito Ogawa, Fujisawa (JP); Yasuhito Ueda, Yokohama (JP); Shinichi Tatsuta, Tokyo (JP); Yuji Kubota, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/781,029

(22) Filed: Feb. 28, 2013

(65) Prior Publication Data
US 2013/0176576 A1 Jul. 11, 2013

Related U.S. Application Data

(63) Continuation of application No. PCT/JP2010/064742, filed on Aug. 30, 2010.

(51) Int. Cl.
  *G01B 11/14* (2006.01)
(52) U.S. Cl.
  USPC .............................................. 356/614
(58) Field of Classification Search
  USPC ................................ 356/614; 250/559.29
  See application file for complete search history.

(56) References Cited

U.S. PATENT DOCUMENTS

| | | | |
|---|---|---|---|
| 5,059,022 A | 10/1991 | Ookawa | |
| 2006/0193221 A1* | 8/2006 | Maruyama et al. | 369/44.41 |
| 2006/0268669 A1* | 11/2006 | Kaji et al. | 369/44.11 |
| 2008/0211246 A1 | 9/2008 | Schorner | |
| 2009/0219549 A1 | 9/2009 | Nishizaka et al. | |
| 2009/0261233 A1 | 10/2009 | Tamiya et al. | |

FOREIGN PATENT DOCUMENTS

| | | |
|---|---|---|
| JP | 2-161332 | 6/1990 |
| JP | 6-167305 | 6/1994 |
| JP | 07-294231 | 11/1995 |
| JP | 11-257917 | 9/1999 |
| JP | 2009-258022 | 11/2009 |
| WO | WO 2007/004497 A1 | 1/2007 |

OTHER PUBLICATIONS

International Search Report mailed Nov. 9, 2010 in PCT/JP2010/064742 filed Aug. 30, 2010 (with English translation).
International Written Opinion mailed Nov. 9, 2010 in PCT/JP2010/064742 filed Aug. 30, 2010.

* cited by examiner

*Primary Examiner* — Roy M Punnoose
(74) *Attorney, Agent, or Firm* — Oblon, Spivak, McClelland, Maier & Neustadt, L.L.P.

(57) ABSTRACT

According to one embodiment, a displacement detection device includes a light source, objective lens, beam splitter, aperture limiting element, and detection device. The beam splitter may separate reflected light into portions. The reflected light may be reflected by the medium and then transmitted through the objective lens. The aperture limiting element may include an aperture limited so as to block a portion of the reflected light. The detection device may detect displacement of the medium in a direction of the optical axis based on the reflected light having passed through the aperture limiting element.

14 Claims, 8 Drawing Sheets

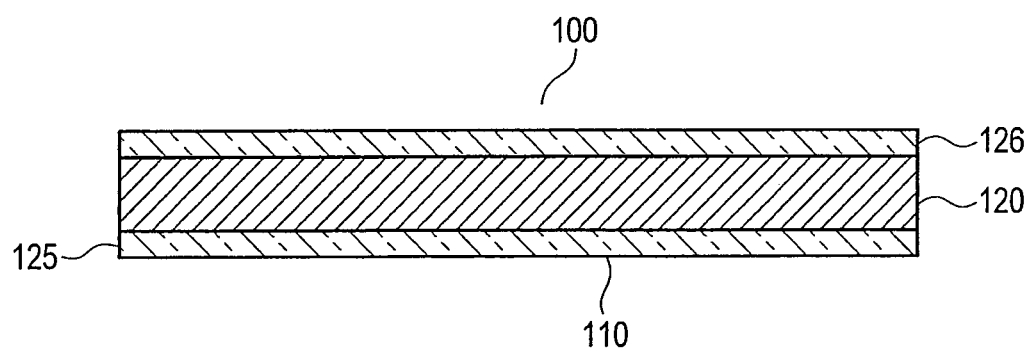
F I G. 2
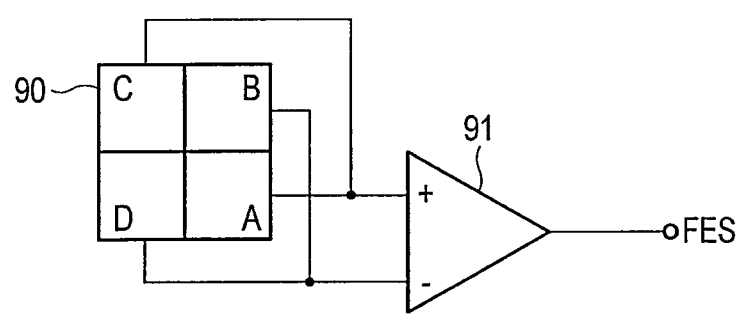
F I G. 3

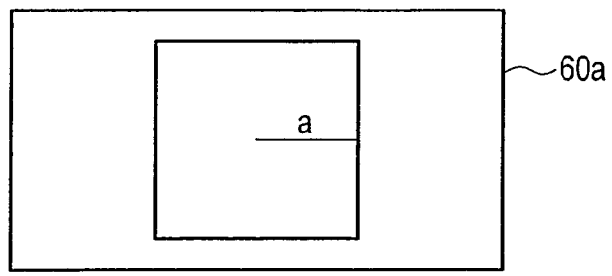
F I G. 7A
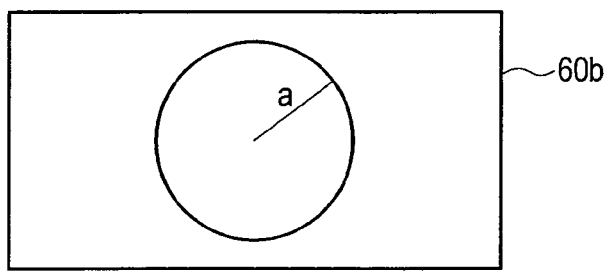
F I G. 7B
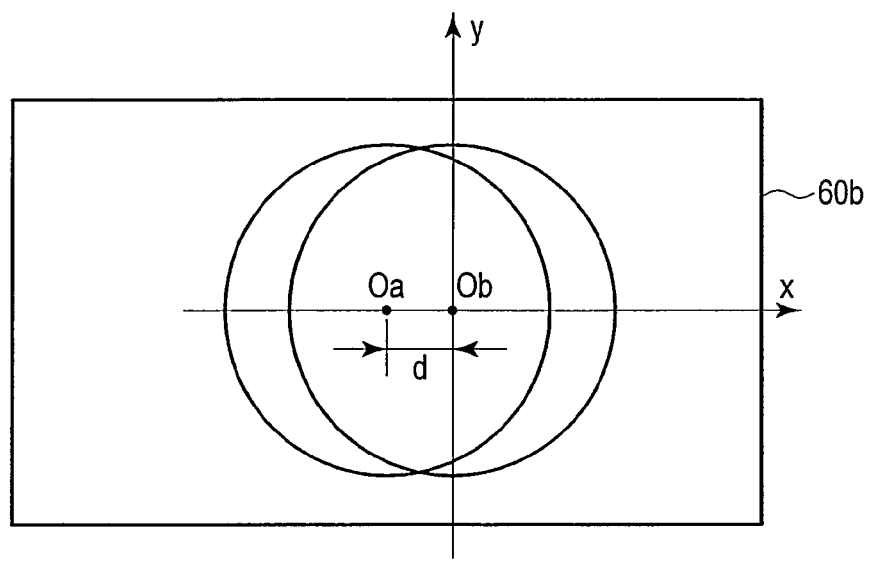
F I G. 8

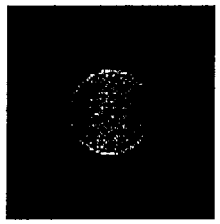
F I G. 10A
F I G. 10B
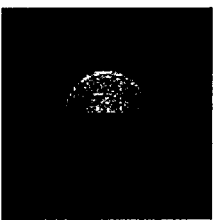
F I G. 10C
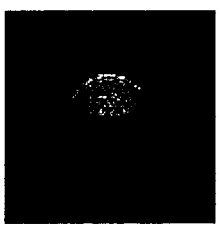
F I G. 10D

DISPLACEMENT DETECTION DEVICE AND METHOD

CROSS REFERENCE TO RELATED APPLICATIONS

This application is a Continuation Application of PCT Application No. PCT/JP2010/064742, filed Aug. 30, 2010, the entire contents of which are incorporated herein by reference.

FIELD

Embodiments described herein relate generally to a displacement detection device and method.

BACKGROUND

The relative positional relation between an optical system with an objective lens and a medium may vary along the direction of the optical axis of the objective lens; the medium stores information by the action of a ray bundle condensed by the objective lens. A displacement detection device is used to monitor displacement of such a medium. When the displacement in the direction of the optical axis of the objective lens is monitored, servo light (measurement light) is introduced onto the optical path of the objective lens. Reflected light from the medium is then guided to the displacement detection device. Based on information on the displacement detected by the displacement detection device, defocusing is compensated for.

BRIEF DESCRIPTION OF THE DRAWINGS

FIG. 2 is a cross-sectional view of a medium;

FIG. 3 is a diagram showing divided cells of a photodetector and an arithmetic operation;

FIG. 7A is a diagram showing an example of the shape of an aperture in an aperture limiting element;

FIG. 7B is a diagram showing an example of the shape of an aperture in the aperture limiting element;

FIG. 8 is a diagram showing the positional relation between the aperture limiting element and an incident ray bundle;

FIG. 10A is a diagram showing, at one rotation angle of the medium, a beam profile observed at a position where the aperture limiting element is installed;

FIG. 10B is a diagram showing, at one rotation angle of the medium, a beam profile observed at the position where the aperture limiting element is installed;

FIG. 10C is a diagram showing, at one rotation angle of the medium, a beam profile observed at a position where the aperture limiting element is installed;

FIG. 10D is a diagram showing, at one rotation angle of the medium, a beam profile observed at the position where the aperture limiting element is installed.

DETAILED DESCRIPTION

In general, according to one embodiment, a displacement detection device includes a light source, objective lens, beam splitter, aperture limiting element, and detection device. The light source may generate light. The objective lens may condense the light in such a manner that the light travels toward a medium. The medium may be rotatable around an axis of rotation and the axis may be orthogonal to an optical axis of the objective lens. The beam splitter may separate reflected light into portions. The reflected light may be reflected by the medium and then transmitted through the objective lens. The aperture limiting element may include an aperture limited so as to block a portion of the reflected light. The detection device may detect displacement of the medium in a direction of the optical axis based on the reflected light having passed through the aperture limiting element.

Figure 1:
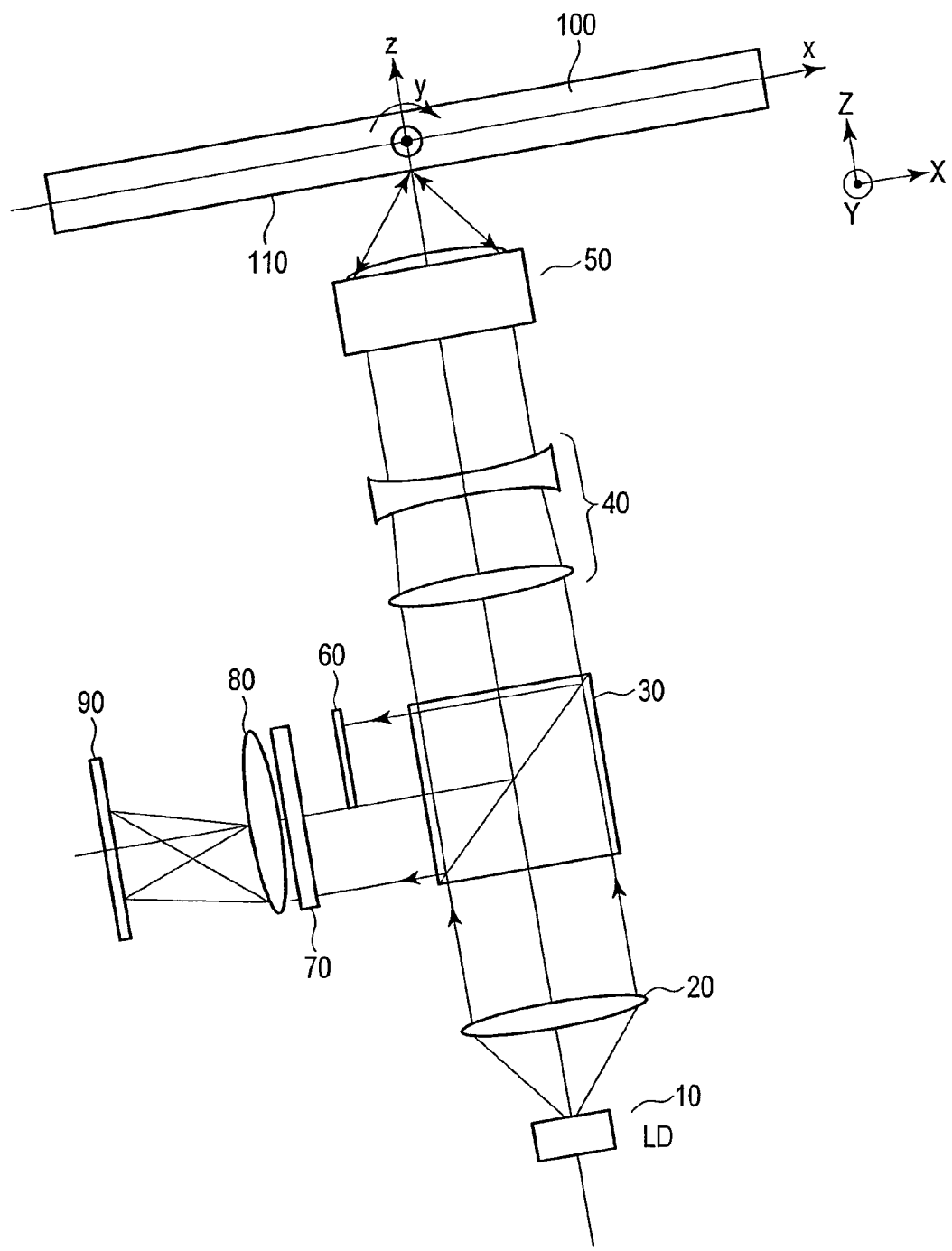
FIG. 1 is a diagram showing a configuration of a displacement detection device according to an embodiment.

FIG. 1 is a diagram showing a configuration of a displacement detection device according to an embodiment. A light source (LD) 10 is, for example, a semiconductor laser with a wavelength of 650 nm. The wavelength of light from the light source 10 may be in a visible region or a near infrared region and is not limited to a particular wavelength. However, the wavelength needs to be such that a sufficient amount of light for detection of a medium 100 can be reflected by the medium 100. The light source 10 emits diffused laser light toward a collimate lens 20. The diffused laser light is converted into collimated laser light by the collimate lens 20. The collimated laser light then enters a beam splitter 30. The laser light at least partly passes through the beam splitter 30 and enters a relay lens 40. The relay lens 40, by its lens effect, changes the beam diameter of the incident laser light (with the beam shape of the collimated light maintained) or converts the laser light into diffused light or convergent light with a shape different from the shape of the incident laser light. The laser light having exited the relay lens 40 enters an objective lens 50.

The objective lens 50 condenses the laser light from the relay lens 40 toward the medium 100. As described below, the medium 100 can be rotated around the axis of rotation y which is orthogonal to the optical axis of the objective lens 50. The laser light having exited the objective lens 50 is condensed on, for example, a surface 110 of the medium 100. The relay lens 40 changes the laser light entering the objective lens 50 into collimated light, diffused light, or convergent light. This enables adjustment of the focal position of the laser light condensed by the objective lens 50. For example, adjustably changing the laser light into diffused light allows the focal position to be moved farther from the objective lens than in the case where collimated light is incident on the objective lens 50. Alternatively, adjustably changing the laser light into convergent light allows the focal position to be moved closer to the objective lens than in the case where collimated light is incident on the objective lens 50.

The medium 100 is, for example, a holographic storage medium and has such a three-layer structure as shown in FIG. 2. The medium 100 is formed of a recording layer 120 in which user data is recorded, and a transparent substrate 125 and a transparent substrate 126 which are located over and under the recording layer 120 so as to sandwich the recording later 120 between the substrates 125 and 126. The thicknesses of the transparent substrates 125 and 126 are not limited to particular values. However, for example, the transparent substrates are 0.5 mm in thickness, and the recording layer is 1.5 mm in thickness. The medium 100 appears shaped like, for example, a circle (for example, 12 cm in diameter) as seen from above in FIG. 2. However, the shape of the medium is not limited to a circle but may be a square, a rectangle, or any other polygon.

If an x axis, a y axis, and a z axis of an orthogonal coordinate system with an origin corresponding to the center of the medium 100 are as shown in FIG. 1, the medium 100 is controllably rotated by a mechanism which rotates around the y axis (not shown in the drawings). If the medium is a holographic storage medium, the direction of rotation around the y axis coincides with the direction of angle multiplexing recording according to a holographic storage technique. When information is read from or written to the holographic storage medium, the medium 100 is rotated to any position around the y axis within a given angular range. The given angle is normally within the range of at least 1° and at most 45°, depending on the recording specification of the holographic storage medium.

A light source used to record information in the holographic storage medium may be prepared separately from the light source 10 for displacement detection and has a wavelength different from the wavelength of the light source 10, for example, a wavelength of close to 405 nm. This advantageously allows consumption of the dynamic range of the medium 10 to be avoided; the consumption results from irradiation of the medium 100 with laser light from the light source 10 for displacement detection.

The laser light condensed on the medium 100 is reflected by, for example, the surface 110 of the medium 100, the displacement of which is to be detected. The laser light enters and passes through the objective lens 50 in a direction opposite to the direction of an optical path toward the medium. The laser light need not necessarily be reflected by the surface 110 of the medium 100, which is close to the objective lens 50. The laser light may be reflected by a surface of the medium 100 which is far from the objective lens 50 or by a plane inside the medium 100. The laser light having exited from the objective lens 50 enters and passes through the relay lens 40 in the direction opposite to the direction of the optical path toward the medium, and then enters a beam splitter 30. The beam splitter 30 reflects and guides at least part of the laser light to an aperture limiting element 60.

With part of the ray bundle blocked by the aperture limiting element 60, the laser light reflected by the beam splitter 30 enters an optical element 70 for knife edge detection. The manner in which the aperture limiting element 60 blocks the ray bundle will be described below.

The optical element 70 for knife edge detection includes, for example, a polarizing element with two prisms joined together. However, the optical element 70 for knife edge detection is not limited to the element formed of prisms and may be any element which enables displacement to be detected according to the knife edge method. For example, the optical element 70 for knife edge detection may be a diffractive optical element or a light blocking element with a knife edge-shaped end. This will also be described below. The laser light having exited the optical element 70 for knife edge detection is condensed on a quadrant photodetector 90 by a condensing lens 80. According to the present embodiment, the optical element 70 for knife edge detection, the condensing lens 80, and the quadrant photodetector 90 forms a detection device which detects displacement of the medium 100 in the direction of the optical axis of the objective lens 50. The aperture limiting element 60 may be interposed between the optical element 70 for knife edge detection and the condensing lens 80.

FIG. 3 shows the divided cells of the quadrant photodetector 90 and an arithmetic operation. The quadrant photodetector 90 is a photoelectric conversion element including four divided cells A, B, C, and D with substantially the same shape. Each cell outputs a current proportional to the amount of laser light delivered to each cell. The current output by the cell is converted, by a current-voltage conversion element (not shown in the drawings), into a voltage proportional to the current. The thus generated voltage proportional to the amount of light delivered to each cell is input to a differential amplifier 91. The differential amplifier 91 outputs an FES (Focus Error Signal) corresponding to the result of an arithmetic operation of the voltage (A+C)−(B+D). The FES is a detection signal indicative of relative displacement between the medium 100 and the objective lens 50 in the z direction shown in FIG. 1.

<Displacement Detection Based on the Knife Edge Method>

The double knife edge method applied to the present embodiment will be described with reference to FIG. 4. FIG. 4 does not take the presence of the aperture limiting element 60 into account for convenience of description.

Figure 4A:
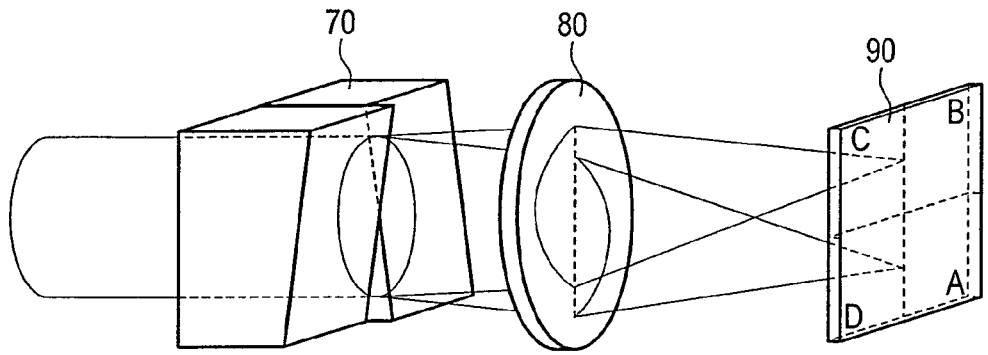
FIG. 4A is a diagram illustrating displacement detection based on a double knife edge method.

FIG. 4A shows a case where the focal position of laser light condensed by the objective lens 50 lies on the surface 110 of the medium 100, the displacement of which is to be detected, that is, the case of zero displacement (focusing). In this case, reflected light from the medium 100 passes through the objective lens 50 to change into collimated light, which then passes through the relay lens 40 and the beam splitter 30 to enter the optical element 70 for knife edge detection. The optical element 70 for knife edge detection comprises two polarizing prisms joined together so as to deflect incident light in opposite, upper and lower directions in the sheet of the drawing. The junction plane between the two polarizing prisms is set at a position where the ray bundle of the collimated light is divided into almost two portions. Thus, the optical element 70 for knife edge detection deflects the substantial half of the incident light in the upper direction in the sheet of the drawing, while polarizing the substantial half of the incident light in the lower direction in the sheet of the drawing.

The two ray bundles thus deflected in the opposite directions are each changed into convergent light by the condensing lens 80. The convergent light is condensed on the quadrant photodetector 90, installed at the focal position of the condensing lens 80. The ray bundle deflected in the upper direction is condensed midway between the upper two detectors (B and C) of the quadrant photodetector 90. Furthermore, the ray bundle deflected in the lower direction is condensed midway between the lower two detectors (A and D) of the quadrant photodetector 90. In this case, the result of the arithmetic operation FES=(A+C)−(B+D), performed by the quadrant photodetector 90, is almost zero.

Figure 4B:
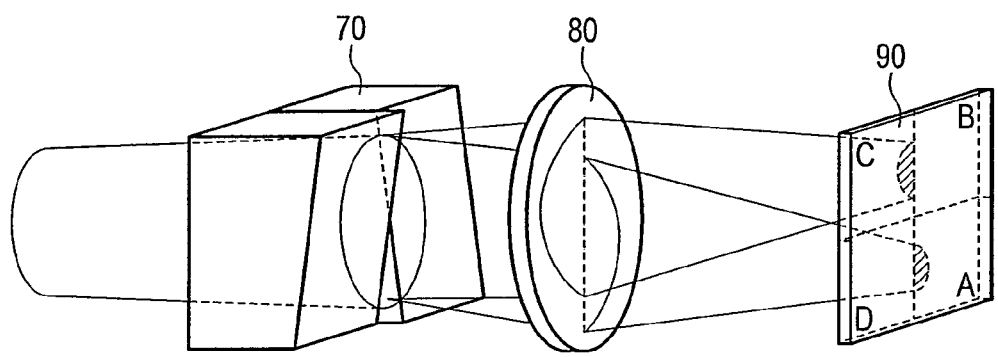
FIG. 4B is a diagram illustrating the displacement detection based on the double knife edge method.

FIG. 4B shows that the surface 110 of the medium 100, the displacement of which is to be detected, is displaced closer to the objective lens 50 (diffusion). In this case, reflected light from the medium 100 passes through the objective lens 50 to change into diffused light, which then passes through the relay lens 40 and the beam splitter 30 to enter the optical element 70 for knife edge detection. As is the case of FIG. 4A, the optical element 70 for knife edge detection deflects the substantial half of the incident light in the upper direction in the sheet of the drawing, while polarizing the substantial half of the incident light in the lower direction in the sheet of the drawing.

The two ray bundles thus deflected in the opposite directions are each changed into convergent light by the condensing lens 80. The convergent light is then condensed on the quadrant photodetector 90. At this time, the beam waist of the convergent light is positioned farther from the condensing lens 80 than the quadrant photodetector 90. Thus, light is delivered mainly to one of the upper two detectors of the quadrant photodetector 90 which lies on the same side as that of half of the ray bundle of the convergent light, that is, the detection cell C. On the other hand, light is delivered mainly to one of the lower two detectors of the quadrant photodetector 90 which lies on the same side as that of half of the ray bundle of the convergent light, that is, the detection cell A. At this time, the result of the arithmetic operation FES=(A+C)−(B+D), performed by the quadrant photodetector 90, is a positive value.

Figure 4C:
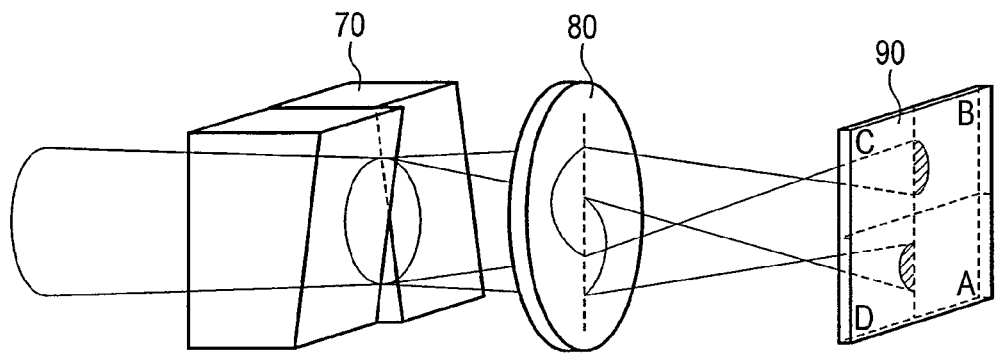
FIG. 4C is a diagram illustrating the displacement detection based on the double knife edge method.

FIG. 4C shows that the surface 110 of the medium 100, the displacement of which is to be detected, is displaced farther from the objective lens 50 (convergence). In this case, reflected light from the medium 100 passes through the objective lens 50 to change into convergent light, which then enters the optical element 70 for knife edge detection. As is the case of FIG. 4A, the optical element 70 for knife edge detection deflects the substantial half of the incident light in the upper direction in the sheet of the drawing, while polarizing the substantial half of the incident light in the lower direction in the sheet of the drawing.

The two ray bundles thus deflected in the opposite directions are each changed into convergent light by the condensing lens 80. The convergent light is then condensed on the quadrant photodetector 90. At this time, the beam waist of the convergent light is positioned closer to the condensing lens 80 than the quadrant photodetector 90. Thus, light is delivered mainly to one of the upper two detectors of the quadrant photodetector 90 which lies opposite half of the ray bundle of the convergent light, that is, the detection cell B. On the other hand, light is delivered mainly to one of the lower two detectors of the quadrant photodetector 90 which lies opposite half of the ray bundle of the convergent light, that is, the detection cell D. At this time, the result of the arithmetic operation FES=(A+C)−(B+D), performed by the quadrant photodetector 90, is a negative value.

Figure 5:
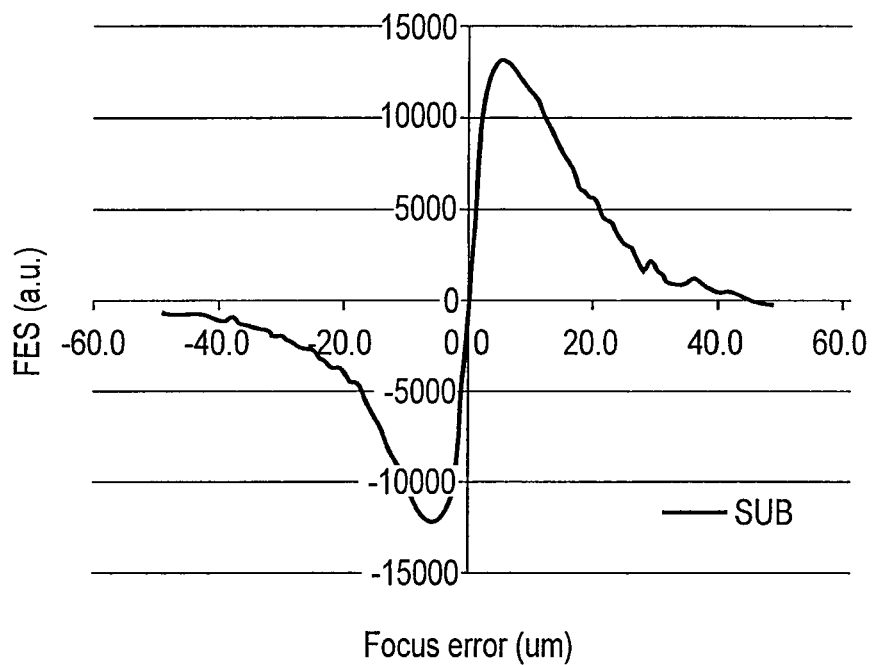
FIG. 5 is a graph showing the relation between medium displacement and a displacement detection signal.

Thus, the optical element 70 for knife edge detection, the condensing lens 80, and the quadrant photodetector 90 can be utilized to detect displacement of the medium 100, the displacement detection target, relative to the direction of optical axis of the objective lens 50 based on the arithmetic operation result FES output by the quadrant photodetector 90. FIG. 5 shows a graph of the results of calculation of the relation between the FES and the displacement relative to the direction of the optical axis of the objective lens 50. In the graph, the axis of abscissa indicates the medium displacement (focus error; in units of μm), and the axis of ordinate indicates a displacement detection signal (focus error signal; FES (a. u.)). The graph shows that the FES obtained is almost proportional to the medium displacement within the range of about ±5 μm from the medium displacement.

Figure 6:
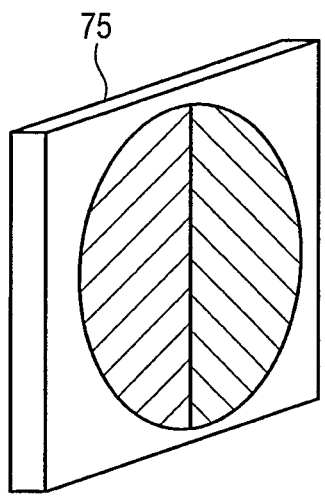
FIG. 6 is a diagram showing another example of an optical element for knife edge detection.

In the present example, the optical element 70 for knife edge detection comprises a compound prism. However, the optical element 70 for knife edge detection is not limited to the compound prism, and any element with optically similar functions, for example, a diffractive optical element, may be used. FIG. 6 shows a diffractive optical element 75 which replaces the optical element 70 for knife edge detection comprising the compound prism. The diffractive optical element 75 is a plate-like light transmissive element comprising a diffraction pattern located in a central portion thereof to diffract transmitted light. The diffractive optical element 75 comprises different diffraction patterns located to the left and right of the center of the entire diffraction pattern, which serves as a boundary. The diffractive optical element 75 thus has functions similar to the functions of the optical element 70 for knife edge detection. For example, light having passed through the left diffraction pattern is diffracted upward, whereas light having passed through the right diffraction pattern is diffracted downward.

<Functions of the Aperture Limiting Element>

Now, the aperture limiting element 60 according to a feature of the present embodiment will be described.

The aperture limiting element 60 suppresses the adverse effect, on the displacement detection signal, of rotation of the medium 100, the displacement detection target, around the y axis shown in FIG. 1. According to the present embodiment, in an optical path joining the objective lens 50, the relay lens 40, the beam splitter 30, the optical element 70 for knife edge detection, and the objective lens 80, the aperture limiting element 60 is arranged between the beam splitter 30 and the optical element 70 for knife edge detection.

The aperture limiting element 60 comprises an aperture limited so as to block part of the ray bundle of reflected light from the medium 100 when the ray bundle reflected by the beam splitter 30 enters the aperture limiting element 60. The aperture in the aperture limiting element 60 is shaped like, for example, such a rectangle as shown in FIG. 7A or such a circle as shown in FIG. 7B. If the objective lens 50 has an aperture radius (a), the aperture in a rectangular aperture limiting element 60a may have a length of 2a on a side. Furthermore, the aperture radius of the aperture in a circular aperture limiting element 60b may be the same as the aperture radius (a) of the objective lens 50.

FIG. 8 shows the positional relation between an incident ray bundle (with a center Ob) and the aperture limiting element 60 (with a center Oa) at a position where the aperture limiting element 60 is installed. The aperture limiting element 60 is arranged so that the center Oa is displaced from the center Ob of the incident ray bundle by (d) along the direction of the x axis. The ray bundle entering the aperture limiting element 60 is light from the light source 10 reflected by the medium 100 and then passing through the objective lens 50 and the beam splitter 30. The center Ob coincides with the optical axis of the objective lens 50. The amount of displacement (d) is determined depending on the maximum angle of rotation through which the medium 100 rotates around the y axis. A manner in which the amount of displacement (d) is determined will be described with reference to FIG. 9.

Figure 9:
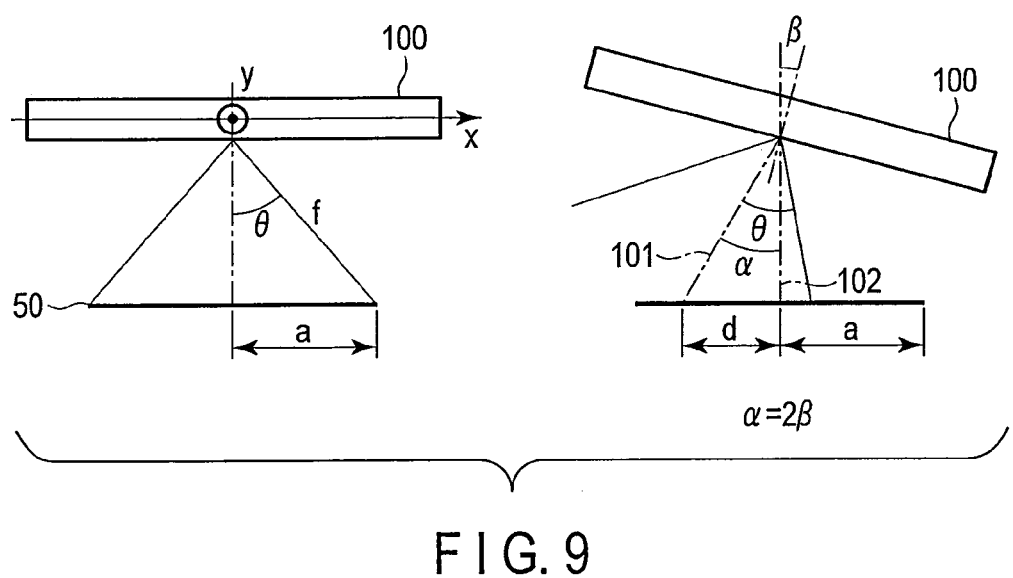
FIG. 9 is a diagram showing the positional relation between reflected light from the medium and an aperture in an objective lens.

FIG. 9 shows the positional relation between reflected light from the medium 100 and the aperture in the objective lens 50. FIG. 9A shows a case where the medium 100 is located face-to-face to the objective lens 50 at a medium rotation angle of 0°. FIG. 9B shows a case where the medium 100 is rotated around the y axis through an angle β with respect to the optical axis of the objective lens 50 (medium rotation angle=β). When the objective lens 50 is assumed to have a numerical aperture NA, a focal distance (f), and an aperture radius (a), the following relation generally holds true.

$$NA = a/f = \sin \theta$$

In the expression, θ denotes the angle between the optical axis and a conical surface of a cone formed by the ray bundle condensed by the objective lens 50. If the medium is rotated through the angle β, a central axis 101 of the conical ray bundle formed by the reflected light from the medium 100 is tilted at an angle of α=2β with respect to an optical axis 102 of the objective lens 50, which is the optical axis of the incident light. The following expression represents a distance (d) between the aperture center of the objective lens 50 and a point where the central axis 101 of the ray bundle of the reflected light intersects with the aperture plane of the objective lens 50.

$$d = f \times \cos\theta \times \tan\alpha$$

As described above, the ray bundle of the reflected light has its center displaced from the aperture center of the objective lens 50 by the distance (d). Thus, when the medium 100 is rotated through the angle β, the amount of displacement of the center Oa of the aperture limiting element 60 from the center Ob of the incident ray bundle may be equal to the value (d). According to the embodiment, the amount of displacement (d) may be determined based on the above description depending on the value of β corresponding to the maximum rotation angle. The reason for this will be described below in detail.

FIG. 10 shows, at each rotation angle of the medium, a beam profile observed at the position where the aperture limiting element 60 is installed.

If the rotation angle β of the medium 100 is 0 and no aperture limiting element is present, a circular beam profile is obtained which is similar to the aperture in the objective lens 50 as shown in FIG. 10A. Next, if the rotation angle β of the medium 100 is 20° and no aperture limiting element is present, the reflected light from the medium 100 is blocked by the aperture in the objective lens 50, resulting in a partial beam profile shaped like a leaf as shown in FIG. 10B.

If the medium 100 has a rotation angle of between 0° and 20°, such a beam profile as shown in FIG. 10B is desirably obtained regardless of the rotation angle of the medium 100 in order to achieve a constant displacement detection sensitivity. The aperture limiting element 60 is provided in order to provide such a beam profile as shown in FIG. 10B regardless of the rotation angle of the medium 100.

FIG. 10C shows a beam profile observed if the rectangular aperture limiting element 60a shown in FIG. 7A is installed to block the half of the incident ray bundle. In this case, the rotation angle β of the medium 100 is 0°. Such a beam profile results from the blockage of the reflected light from the medium 100 by the rectangular aperture limiting element 60a instead of the aperture in the objective lens 50. Compared to the beam profile in FIG. 10A, in which no aperture limiting element is installed, the beam profile in FIG. 10C is similar to the beam profile in FIG. 10B, in which the medium 100 has a rotation angle β of 20°.

Moreover, FIG. 10d shows a beam profile observed if the circular aperture limiting element 60b shown in FIG. 7B is installed with the amount of displacement d=a. The medium 100 has a rotation angle β of 0°.

In this case, a beam profile is obtained which is almost the same as the beam profile in FIG. 10B, in which the medium 100 has a rotation angle β of 20°. Thus, if the circular aperture limiting element 60a is installed under the condition that the amount of displacement d=a, the displacement detection sensitivity is expected to be stabilized.

Figure 11:
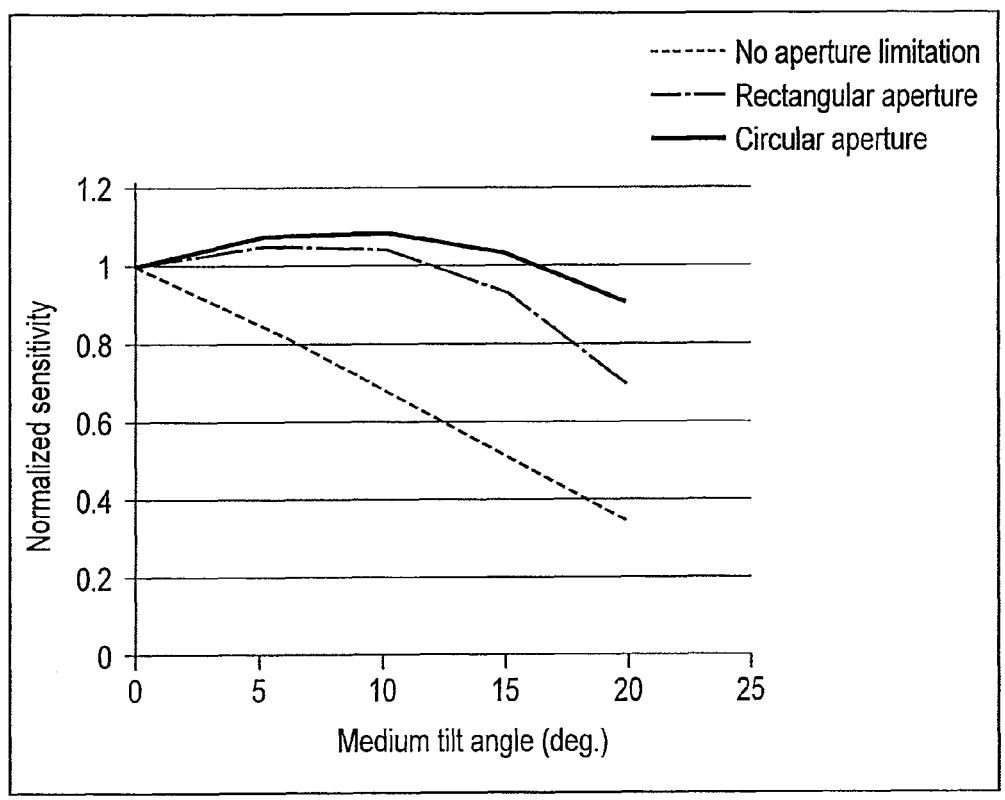
FIG. 11 is a diagram illustrating the relation between the tilt angle of the medium and displacement detection sensitivity.

FIG. 11 shows a manner in which the displacement detection sensitivity of the medium varies with tilt angle depending on whether or not an aperture limiting element is installed and the shape of the aperture. The axis of abscissa indicates the tilt angle (deg), and the axis of ordinate indicates normalized sensitivity (displacement detection sensitivity). A solid line indicates the case where the circular aperture limiting element 60b is installed. An alternate long and short dash line indicates the case where the rectangular aperture limiting element 60a is installed. A broken line indicates the case where no aperture limiting element 60a is installed.

If the aperture limiting element 60 is not installed, the displacement detection sensitivity decreases almost linearly with the tilt of the medium 100. When the medium is tilted at an angle of 20°, the sensitivity is one-third of the sensitivity achieved when the tilt angle is 0°. On the other hand, provision of the aperture limiting element suppresses a decrease in detection sensitivity caused by the tilt of the medium 100. In particular, if the circular aperture limiting element 60b is installed, when the medium 100 has a tilt angle of between 0° and 20°, the detection sensitivity is achieved to within ±10%. This indicates that appropriate displacement detection characteristics are obtained.

The above-described embodiment comprises the aperture limiting element 60 with the aperture limited so as to block part of the ray bundle of reflected light from the medium 100 when the ray bundle reflected by the beam splitter 30 enters the aperture limiting element 60. The embodiment can thus suppress the adverse effect of the tilt of the medium 100, the displacement detection target, on the displacement detection signal. Therefore, the embodiment can accurately detect the displacement of the tilted medium 100 with a variation in displacement detection sensitivity suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A displacement detection device comprising:
   a light source that generates light;
   an objective lens that condenses the light in such a manner that the light travels toward a medium, the medium being rotatable around an axis of rotation and the axis being orthogonal to an optical axis of the objective lens;
   a beam splitter that separates reflected light into portions, the reflected light being reflected by the medium and then transmitted through the objective lens;
   an aperture limiting element including an aperture limited so as to block a portion of the reflected light; and
   a detection device that detects displacement of the medium in a direction of the optical axis based on the reflected light having passed through the aperture limiting element.

2. The device according to claim 1, wherein a range of the reflected light which is blocked is set depending on a maximum rotation angle of the medium.

3. The device according to claim 1, wherein the aperture is rectangular and comprises an aperture center at a position displaced from the optical axis by a given amount.

4. The device according to claim 3, wherein the position is set depending on a maximum rotation angle of the medium.

5. The device according to claim 1, wherein the aperture is circular and comprises an aperture center at a position displaced from the optical axis by a given amount.

6. The device according to claim 1, wherein the detection device comprises an optical element that generates a displacement detection effect based on a knife edge method.

7. The device according to claim 1, wherein the medium comprises a holographic recording medium, and a direction of the rotation includes a direction of angle multiplexing recording.

8. A displacement detection method comprising:

generating light;

condensing, by an objective lens, the light in such a manner that the light travels toward a medium, the medium being rotatable around an axis of rotation and the axis being orthogonal to an optical axis of the objective lens;

separating reflected light into portions, the reflected light being reflected by the medium and then transmitted through the objective lens;

utilizing an aperture limiting element including an aperture limited so as to block a portion of the reflected light; and detecting displacement of the medium in a direction of the optical axis based on the reflected light having passed through the aperture limiting element.

9. The method according to claim 8, wherein a range of the reflected light which is blocked is set depending on a maximum rotation angle of the medium.

10. The method according to claim 8, wherein the aperture is rectangular and comprises an aperture center at a position displaced from the optical axis by a given amount.

11. The method according to claim 10, wherein the position is set depending on a maximum rotation angle of the medium.

12. The method according to claim 8, wherein the aperture is circular and comprises an aperture center at a position displaced from the optical axis by a given amount.

13. The method according to claim 8, wherein the detecting comprises utilizing an optical element that generates a displacement detection effect based on a knife edge method.

14. The method according to claim 8, wherein the medium comprises a holographic recording medium, and a direction of the rotation includes a direction of angle multiplexing recording.

* * * * *